(12) United States Patent
Lowry et al.

(10) Patent No.: US 8,998,116 B2
(45) Date of Patent: Apr. 7, 2015

(54) REAGENT INJECTOR WITH CRIMPED PINTLE

(75) Inventors: John M. Lowry, Brooklyn, MI (US); David Blumhardt, Jackson, MI (US); Eric Grant, Ypsilanti, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 90 days.

(21) Appl. No.: 13/606,409

(22) Filed: Sep. 7, 2012

(65) Prior Publication Data
US 2014/0070031 A1     Mar. 13, 2014

(51) Int. Cl.
*B05B 1/30*     (2006.01)
*F02M 51/00*    (2006.01)
*F01N 3/20*     (2006.01)
*F02M 61/16*    (2006.01)
*F02M 61/18*    (2006.01)
*F02M 63/00*    (2006.01)

(52) U.S. Cl.
CPC ....... *F01N 3/2066* (2013.01); *F01N 2610/1453* (2013.01); *F02M 61/168* (2013.01); *F02M 61/18* (2013.01); *F02M 63/0036* (2013.01); *Y02T 10/24* (2013.01); *Y10T 29/49433* (2013.01); *Y10S 239/90* (2013.01)

(58) Field of Classification Search
CPC ............ F02M 51/065; F02M 51/0642; F02M 51/0646; F02M 51/0657; F02M 51/0664; F02M 2200/8053; F02M 2200/8061; F02M 2547/001; F02M 21/0272

USPC ................................. 239/900, 585.1–585.5; 29/890.12–890.15; 251/129.21, 356, 251/365

See application file for complete search history.

(56) References Cited

U.S. PATENT DOCUMENTS

| 4,483,485 | A | * | 11/1984 | Kamiya et al. ............. 239/585.4 |
| 5,027,871 | A | * | 7/1991 | Guenther ....................... 141/198 |
| 6,045,116 | A | * | 4/2000 | Willke et al. ............. 251/129.21 |
| 6,065,495 | A | * | 5/2000 | Fong et al. ................ 137/625.25 |
| 6,199,776 | B1 | | 3/2001 | Andorfer |
| 6,371,383 | B1 | * | 4/2002 | Bulgatz ............................. 239/1 |
| 8,037,869 | B2 | * | 10/2011 | Ricco et al. ................... 123/472 |
| 8,047,452 | B2 | | 11/2011 | Martin et al. |
| 2006/0076438 | A1 | | 4/2006 | Dallmeyer |

* cited by examiner

*Primary Examiner* — Len Tran
*Assistant Examiner* — Alexander Valvis
(74) *Attorney, Agent, or Firm* — Harness, Dickey & Pierce, P.L.C.

(57) ABSTRACT

An injector for injecting a reagent includes an electromagnet and an axially translatable valve member positioned within a housing. The valve member is moveable from a seated position to an unseated position in response to energizing the electromagnet. The valve member includes a hollow tube including a curled end having a reduced diameter sized to allow a ball to partially extend beyond the tube end but not pass through the tube. The tube includes an inwardly extending detent restricting the ball from movement within the tube. A pintle head is fixed to the tube and positioned proximate the electromagnet.

19 Claims, 5 Drawing Sheets

REAGENT INJECTOR WITH CRIMPED PINTLE

FIELD

The present disclosure relates to injector systems and, more particularly, relates to an injector system for injecting a reagent, such as an aqueous urea solution, into an exhaust stream to reduce oxides of nitrogen ($NO_x$) emissions from diesel engine exhaust.

BACKGROUND

This section provides background information related to the present disclosure which is not necessarily prior art. Lean burn engines provide improved fuel efficiency by operating with an excess of oxygen, that is, a quantity of oxygen that is greater than the amount necessary for complete combustion of the available fuel. Such engines are said to run "lean" or on a "lean mixture." However, this improved or increase in fuel economy, as opposed to non-lean burn combustion, is offset by undesired pollution emissions, specifically in the form of oxides of nitrogen ($NO_x$).

One method used to reduce $NO_x$ emissions from lean burn internal combustion engines is known as selective catalytic reduction (SCR). SCR, when used, for example, to reduce $NO_x$ emissions from a diesel engine, involves injecting an atomized reagent into the exhaust stream of the engine in relation to one or more selected engine operational parameters, such as exhaust gas temperature, engine rpm or engine load as measured by engine fuel flow, turbo boost pressure or exhaust $NO_x$ mass flow. The reagent/exhaust gas mixture is passed through a reactor containing a catalyst, such as, for example, activated carbon, or metals, such as platinum, vanadium or tungsten, which are capable of reducing the $NO_x$ concentration in the presence of the reagent.

An aqueous urea solution is known to be an effective reagent in SCR systems for diesel engines. However, use of such an aqueous urea solution may involve disadvantages. Urea is highly corrosive and may adversely affect mechanical components of the SCR system, such as the injectors used to inject the urea mixture into the exhaust gas stream. Urea also may solidify upon prolonged exposure to high temperatures, such as temperatures encountered in diesel exhaust systems. Solidified urea may accumulate in the narrow passageways and exit orifice openings typically found in injectors. Solidified urea may also cause fouling of moving parts of the injector and clog any openings or urea flow passageways, thereby rendering the injector unusable.

Some reagent injection systems are configured to include a pump, a supply line and a return line such that aqueous urea is continuously pumped to minimize solidification and also transfer heat from the injector to the aqueous urea stored at a remote location. Some injectors are equipped with moveable members including a hollow tube to provide a return flow path for reagent that has not been injected. The hollow tubes may be welded to valve bodies having conically-shaped ends engaging a valve seat. The valve bodies are typically complex components constructed from high alloy metals. Relatively expensive electron beam or laser welding may be required to fix the tube to the valve body. While relatively complex injector valve members have functioned properly in the past, these components may be relatively costly, complex and sizeable. Accordingly, it may be desirable to provide an improved injector system including a reagent injector having an improved pintle assembly.

SUMMARY

This section provides a general summary of the disclosure, and is not a comprehensive disclosure of its full scope or all of its features.

An injector for injecting a reagent includes an electromagnet and an axially translatable valve member positioned within a housing. The valve member is moveable from a seated position to an unseated position in response to energizing the electromagnet. The valve member includes a hollow tube including a curled end having a reduced diameter sized to allow a ball to partially extend beyond the tube end but not pass through the tube. The tube includes an inwardly extending detent restricting the ball from movement within the tube. A pintle head is fixed to the tube and positioned proximate the electromagnet.

A method of constructing a reagent injector includes providing a substantially cylindrical tube having a first end and an opposite second end. An inner diameter of the tube is reduced at the first end. A ball is inserted into the tube at the second end. The ball abuts an inner surface of the tube at the reduced diameter first end such that a portion of the ball extends outside of the tube beyond the first end. The tube is crimped to form a radially inwardly protruding detent to restrict the ball from moving toward the second end. A pintle head is coupled to the second end of the tube.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

It should be understood that although the present teachings may be described in connection with diesel engines and the reduction of $NO_x$ emissions, the present teachings may be used in connection with any one of a number of exhaust streams, such as, by way of non-limiting example, those from diesel, gasoline, turbine, fuel cell, jet or any other power source outputting a discharge stream. Moreover, the present teachings may be used in connection with the reduction of any one of a number of undesired emissions. For example, injection of hydrocarbons for the regeneration of diesel particulate filters is also within the scope of the present disclosure. For additional description, attention should be directed to commonly-assigned U.S. Pat. No. 8,047,452, issued Nov. 1, 2011, entitled "Method And Apparatus For Injecting Atomized Fluids", which is incorporated herein by reference.

Figure 1:
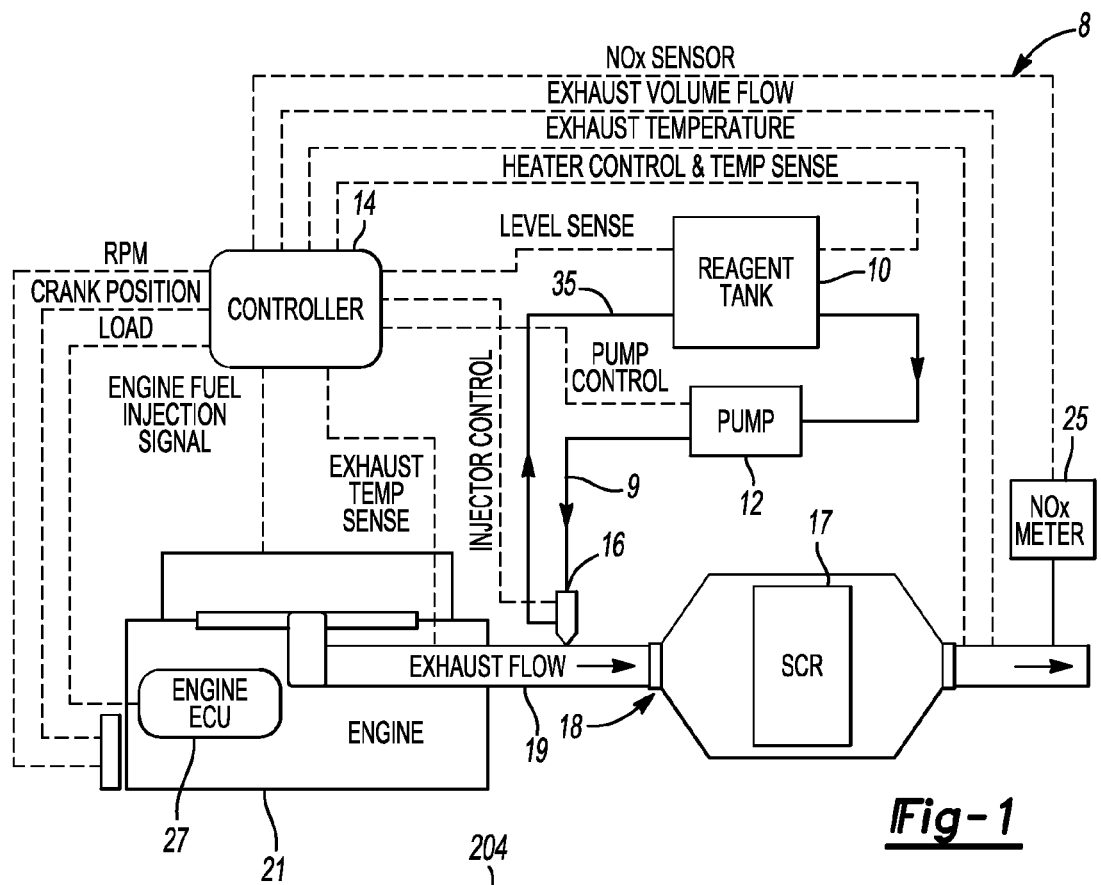
FIG. 1 is a schematic depicting an exemplary exhaust aftertreatment system including an electromagnetically controlled reagent injector constructed in accordance with the teachings of the present disclosure.
Figure 2:
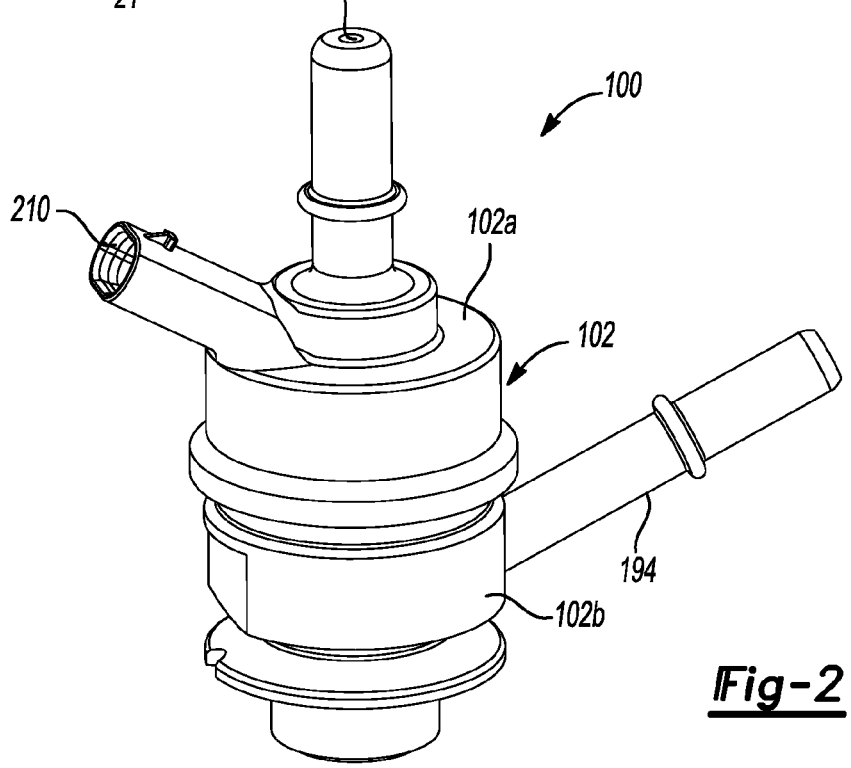
FIG. 2 is a perspective view of a reagent injector constructed accordance to the teachings of the present disclosure.
Figure 3:
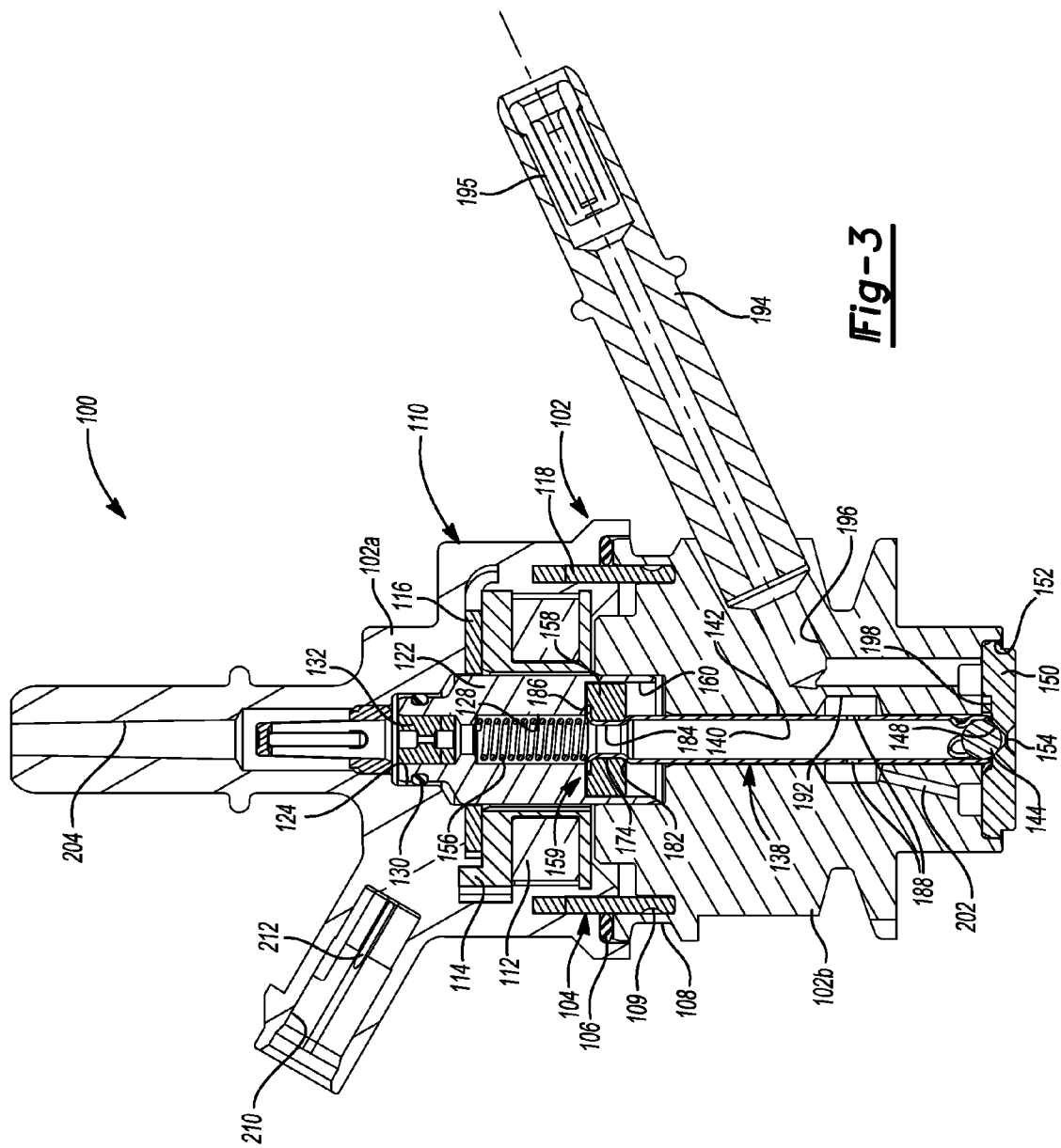
FIG. 3 is a cross-sectional view taken through the injector.
Figure 4:
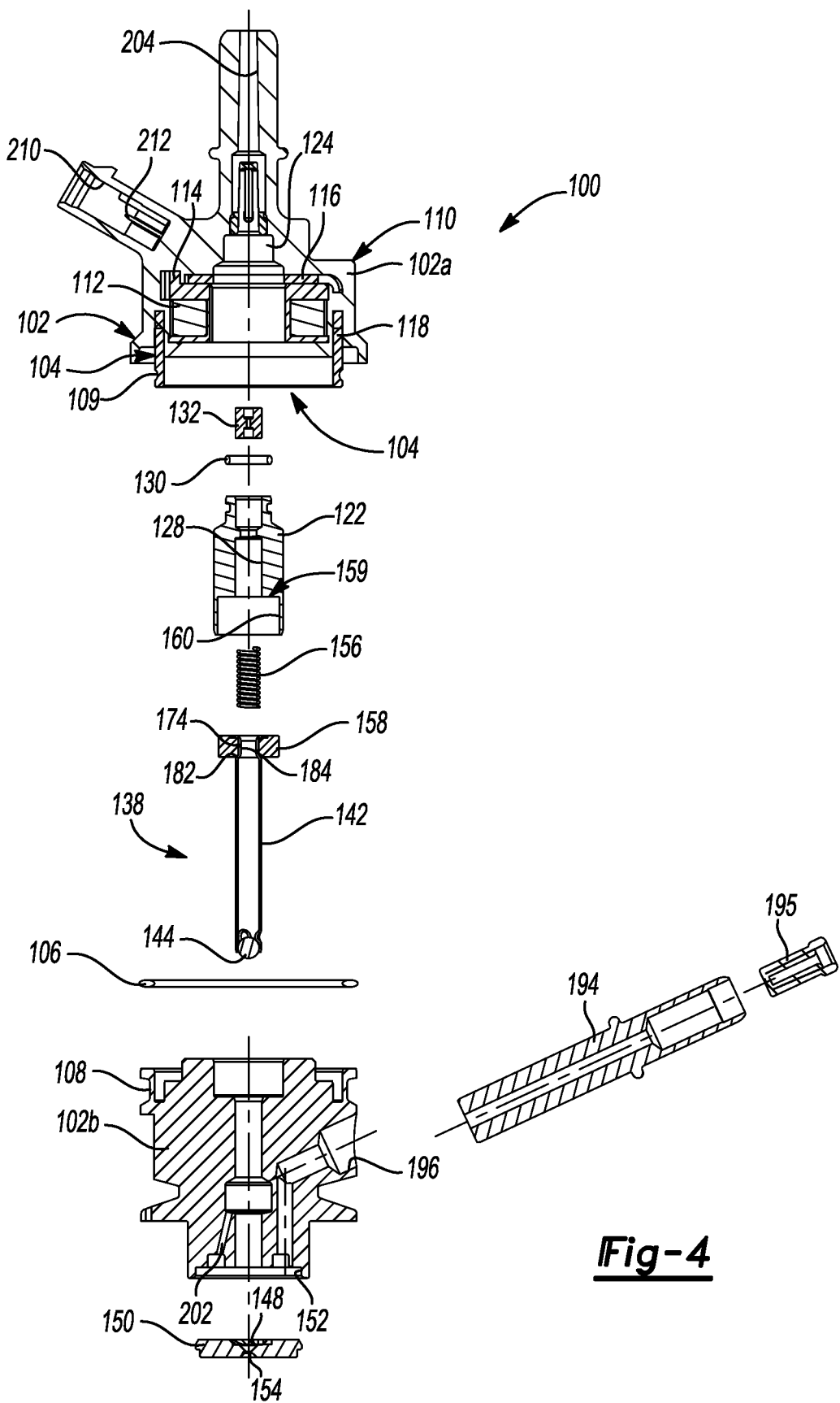
FIG. 4 is a cross-sectional exploded view of the injector.
Figure 5:
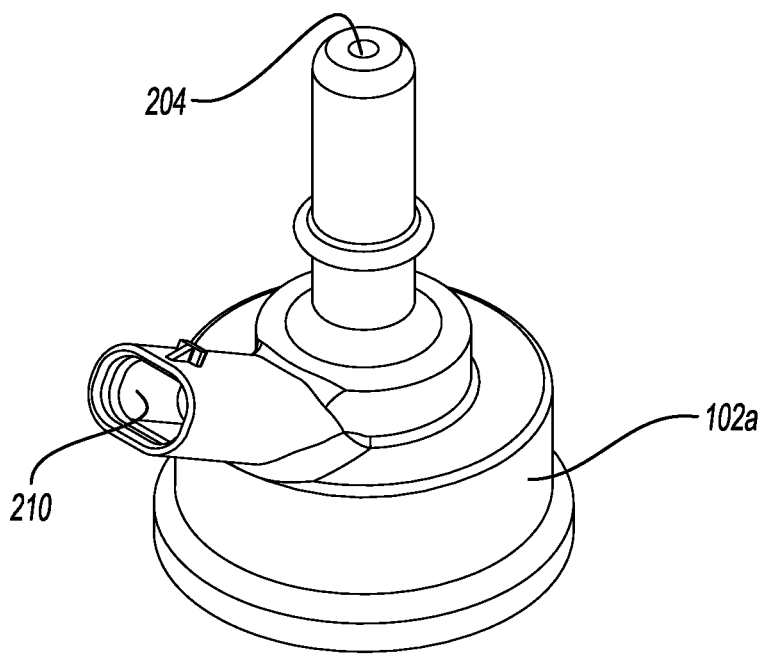
FIG. 5 is a fragmentary partial exploded perspective view of the injector.
Figure 5:
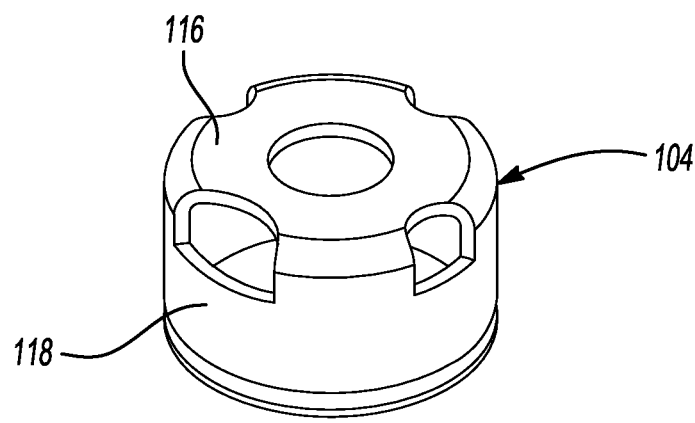
Figure 5:
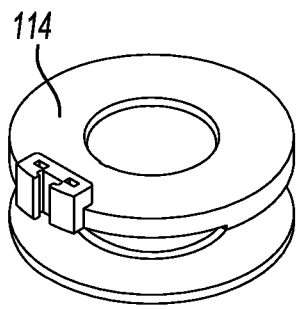
Figure 5:
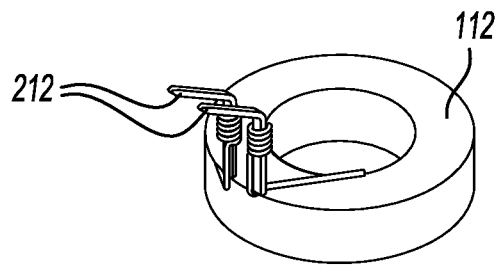
Figure 6:
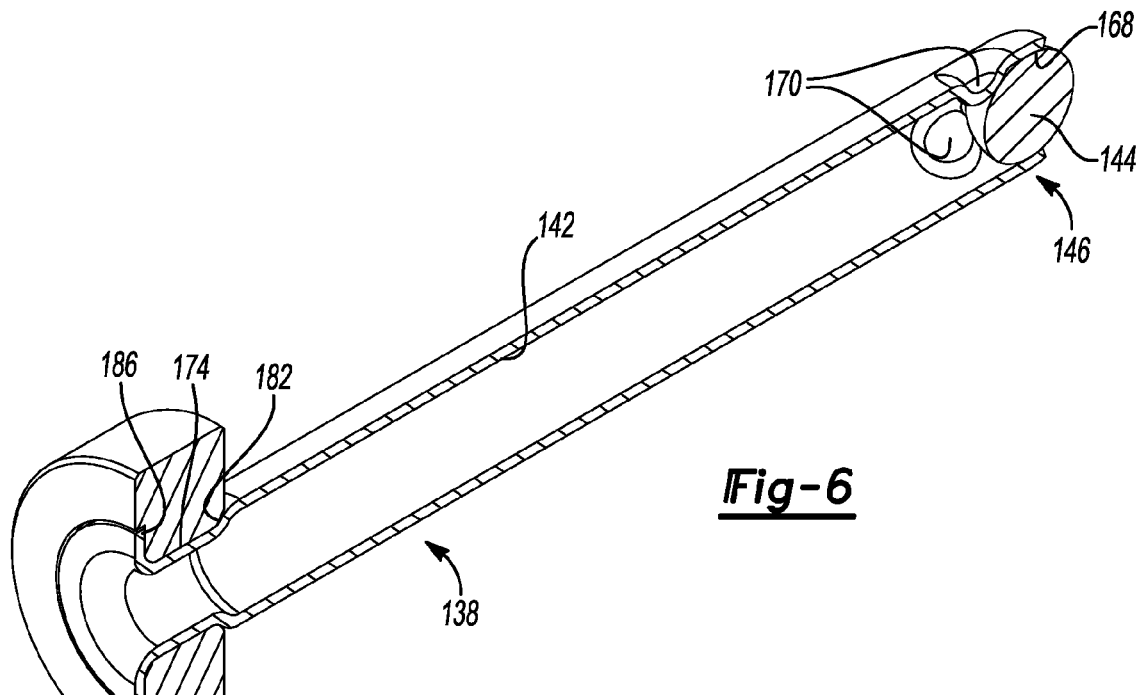
FIG. 6 is a sectional perspective view of a valve member of the injector.
Figure 7:
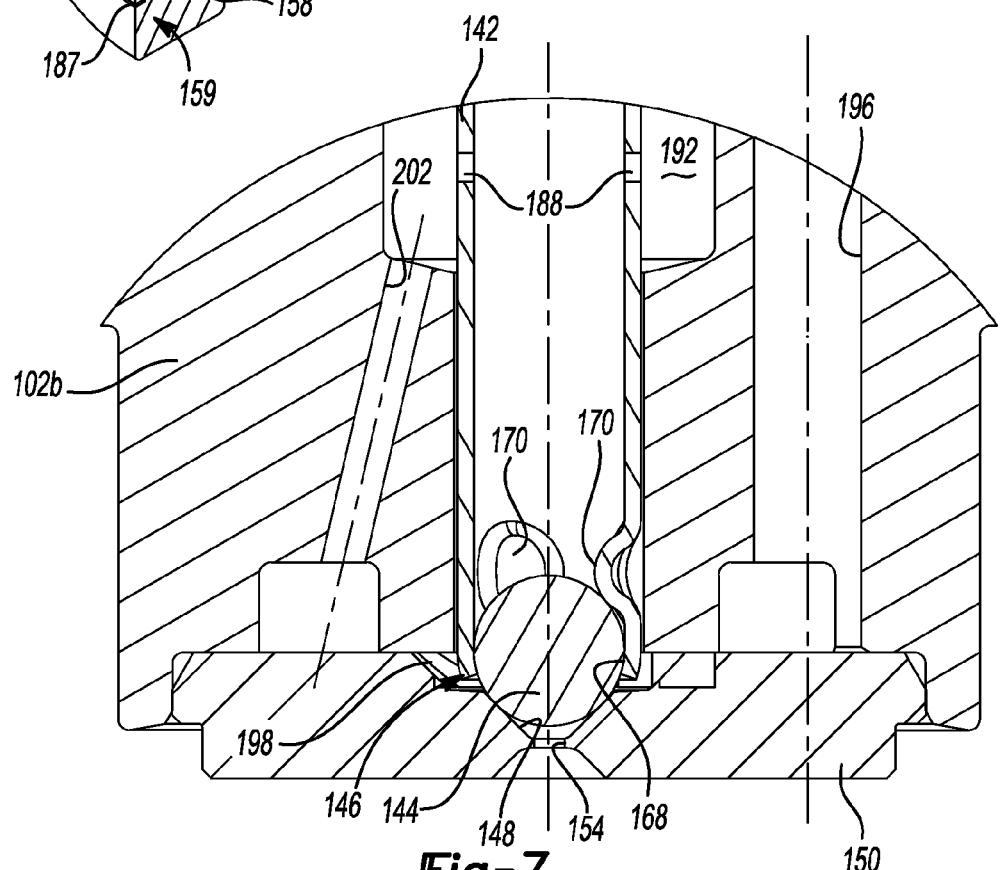
FIG. 7 is an enlarged fragmentary sectional view of the injector.

With reference to the Figures, a pollution control system 8 for reducing $NO_x$ emissions from the exhaust of a diesel engine 21 is provided. In FIG. 1, solid lines between the elements of the system denote fluid lines for reagent and dashed lines denote electrical connections. The system of the present teachings may include a reagent tank 10 for holding the reagent and a delivery module 12 for delivering the reagent from the tank 10. The reagent may be a urea solution, a hydrocarbon, an alkyl ester, alcohol, an organic compound, water, or the like and can be a blend or combination thereof. It should also be appreciated that one or more reagents can be available in the system and can be used singly or in combination. The tank 10 and delivery module 12 may form an integrated reagent tank/delivery module. Also provided as part of system 8 is an electronic injection controller 14, a reagent injector 16, and an exhaust system 18. Exhaust system 18 includes an exhaust conduit 19 providing an exhaust stream to at least one catalyst bed 17.

The delivery module 12 may comprise a pump that supplies reagent from the tank 10 via a supply line 9. The reagent tank 10 may be polypropylene, epoxy coated carbon steel, PVC, or stainless steel and sized according to the application (e.g., vehicle size, intended use of the vehicle, and the like). A pressure regulator (not shown) may be provided to maintain the system at predetermined pressure setpoint (e.g., relatively low pressures of approximately 60-80 psi, or in some embodiments a pressure of approximately 60-150 psi) and may be located in the return line 35 from the reagent injector 16. A pressure sensor may be provided in the supply line 9 leading to the reagent injector 16. The system may also incorporate various freeze protection strategies to thaw frozen reagent or to prevent the reagent from freezing. During system operation, regardless of whether or not the injector is releasing reagent into the exhaust gases, reagent may be circulated continuously between the tank 10 and the reagent injector 16 to cool the injector and minimize the dwell time of the reagent in the injector so that the reagent remains cool. Continuous reagent circulation may be necessary for temperature-sensitive reagents, such as aqueous urea, which tend to solidify upon exposure to elevated temperatures of 300° C. to 650° C. as would be experienced in an engine exhaust system.

Furthermore, it may be desirable to keep the reagent mixture below 140° C. and preferably in a lower operating range between 5° C. and 95° C. to ensure that solidification of the reagent is prevented. Solidified reagent, if allowed to form, may foul the moving parts and openings of the injector.

The amount of reagent required may vary with load, exhaust gas temperature, exhaust gas flow, engine fuel injection timing, desired $NO_x$ reduction, barometric pressure, relative humidity, EGR rate and engine coolant temperature. A $NO_x$ sensor or meter 25 is positioned downstream from catalyst bed 17. $NO_x$ sensor 25 is operable to output a signal indicative of the exhaust $NO_x$ content to an engine control unit 27. All or some of the engine operating parameters may be supplied from engine control unit 27 via the engine/vehicle databus to the reagent electronic injection controller 14. The reagent electronic injection controller 14 could also be included as part of the engine control unit 27. Exhaust gas temperature, exhaust gas flow and exhaust back pressure and other vehicle operating parameters may be measured by respective sensors.

With reference now to FIGS. 2-7, reagent injector 100 will be further described. Reagent injector 100 includes an injector body 102 having an upper section 102a and a lower section 102b. A flux frame 104 interconnects upper section 102a and lower section 102b. A seal 106 is provided at an interface between the upper and lower sections. Lower section 102b may include a deformable portion 108 that is crimped to flux frame 104 at a retaining groove 109.

An electromagnet assembly 110 is positioned within upper section 102a as depicted in the Figures. Electromagnet assembly 110 includes a coil of wire 112 wrapped around a bobbin 114. Flux frame 104 includes an end wall 116 adjacent bobbin 114 and a cylindrical wall 118 surrounding electromagnet assembly 110.

A pole piece 122 is received within a bore 124 of upper section 102a. Pole piece 122 extends through bobbin 114. A bore 128 extends through pole piece 122 to provide a return flow path for injected reagent as will be described in greater detail. A seal 130 is positioned between upper section 102a and pole piece 122. An orifice 132 is positioned within bore 128 to restrict the rate of reagent flow therethrough.

A valve member 138 is slidably positioned within a bore 140 extending through lower section 102b. Valve member 138 is constructed as an elongated pintle including a stainless steel cylindrical tube 142. A hardened steel ball 144 is fixed to an end 146 of tube 142. Ball 144 is selectively engageable with a valve seat 148 provided on an orifice plate 150. Orifice plate 150 may be coupled to and retained within a recess 152 of lower section 102b. Orifice plate 150 includes an orifice 154 through which pressurized reagent may flow when valve member 138 is moved from its seated position. When valve member 138 is in the seated or closed position, ball 144 sealingly engages seat 148 such that reagent may not pass through orifice 154. A spring 156 is positioned within bore 128 of pole piece 122 to urge valve member 138 toward the seated position. Valve member 138 is moveable to an unseated, open position where ball 144 is spaced apart from seat 148. Valve seat 148 surrounds orifice 154 and may be conically or cone-shaped.

A pintle head 158 is fixed to an end 159 of tube 142 opposite end 146. Pintle head 158 is slidably positioned within a counterbore 160 formed in pole piece 122. A running-class slip fit between pintle head 158 and bore 160 provides a guide for axial movement of valve member 138. Another running-class fit may exist between tube 142 and bore 140 to provide another guide for aligning valve member 138 with seat 148. Pintle head 158 may be stamped from a magnetic metal sheet.

Valve member 138 may be rapidly and economically constructed by beginning with a substantially straight walled cylindrical tube. End 146 of tube 142 is mechanically deformed to curl the tube wall radially inwardly. This process step locally reduces an inner diameter of tube 142. The new reduced inner diameter is sized to restrict ball 144 from passing therethrough while also allowing a portion of the ball to extend beyond end 146 such that the spherical surface of ball 144 may contact seat 148.

After end 146 of tube 142 is curled, ball 144 is inserted into tube 142 from end 159. Ball 144 is urged into contact with an inner partially spherically-shaped surface 168 of tube 142. At this time, tube 142 is further mechanically deformed in a crimping process where several circumferentially spaced apart detents 170 inwardly protrude to contact ball 144. After the crimping process has been completed, ball 144 is retained at a fixed location between curved surface 168 and detents 170. The present process avoids the costs and possible complications relating to other mechanical fastening processes including welding.

To continue the manufacturing process step of valve member 138, a portion 174 of tube 142 is necked down to have a reduced diameter. Tube 142 is cut to a predetermined overall length. Pintle head 158 is placed over portion 174 and placed in engagement with a stop 182 located at a transition between reduced diameter portion 174 and the adjacent portion of tube 142 having its original larger outer diameter. A bore 184 extending through pintle head 158 may be sized to engage reduced diameter portion 174 in a press-fit manner. After pintle head 158 has been assembled to tube 142, end 159 of tube 142 is flared, crimped or otherwise mechanically deformed to provide an enlarged diameter flange 186 to trap pintle head 158 between stop 182 and flange 186. Pintle head 158 may include a recess 187 in receipt of flange 186. A plurality of radially extending apertures 188 are drilled through tube 142. Apertures 188 are axially positioned at a location in communication with a reservoir 192 positioned in lower section 102b.

An inlet tube 194 is fixed to lower section 102b and provides a path for pressurized reagent to enter injector 100. A filter 195 is mounted within inlet tube 194. A passageway 196 extends through lower section 102b placing pressurized reagent provided from inlet tube 194 in communication with slots 198 of orifice plate 150. Slots 198 urge pressurized reagent to swirl and exit orifice 154 when valve member 138 is in the open position. Passageway 196 is in communication with a passage 202 that is in turn in communication with reservoir 192. As such, a return flow path for pressurized reagent that does not exit orifice 154 is provided. In particular, reagent flows through inlet tube 194, passageway 196, passage 202, reservoir 192 and apertures 188 to enter tube 142. Pressurized reagent flows through tube 142, bore 128, orifice 132 and exits injector 100 through an outlet 204.

A receptacle 210 of upper section 102a includes a terminal 212 in electrical communication with coil 112. When coil 112 is electrically energized, a magnetic field is generated. Pintle head 158 is drawn toward pole piece 122 to move valve member 138 from the seated position to the unseated, open position. Pressurized fluid is injected into exhaust conduit 19.

It should be appreciated that the lightweight, easily manufacturable valve member previously described may also be used with any number of other injectors having different configurations than the injector depicted in the Figures. In addition to the manufacturing advantages previously presented, the valve member including a crimped pintle may facilitate the use of a reduced diameter tube in view of the inventive ball retention method. The corresponding bore in which the valve member slides may also be reduced in size such that the injector assembly may also exhibit reduced size and weight.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. An injector for injecting a reagent, comprising:
a housing;
an electromagnet positioned within the housing; and
an axially translatable valve member positioned within the housing, the valve member being translated from a seated position to an unseated position in response to energizing the electromagnet, the valve member including a hollow tube having a substantially constant wall thickness, a ball and a pintle head, the tube including a curled end having a reduced diameter sized to allow the ball to partially extend beyond the tube end but not pass through the tube, the tube including an inwardly extending detent restricting the ball from movement within the tube, the pintle head being fixed to the tube and positioned proximate the electromagnet, wherein the tube includes another inwardly extending detent circumferentially spaced apart from the detent.

2. The injector of claim 1, wherein the tube includes a reduced diameter portion extending through the pintle head.

3. The injector of claim 2, wherein the tube includes a flange engaging the pintle head to retain the pintle head on the tube.

4. The injector of claim 3, wherein the tube includes a stop restricting movement of the pintle head toward the ball.

5. The injector of claim 1, wherein the detent is monolithically formed from the tube.

6. The injector of claim 1, wherein the detent includes an inner surface of the tube being in direct contact with the ball.

7. The injector of claim 1, wherein the tube provides a return path for reagent that has not been injected.

8. The injector of claim 7, wherein the tube includes apertures extending therethrough to provide a flow path for reagent.

9. The injector of claim 1, wherein the curled end includes a partially spherically-shaped inner surface of the tube.

10. An injector for injecting a reagent, comprising:
a housing including an orifice and a valve seat; and
an axially translatable valve member positioned within the housing, the valve member including a hollow tube having a substantially constant wall thickness and a ball, the tube including a distal end having a reduced diameter, the ball positioned within the tube partially extending beyond the distal end and being restricted from passing through the tube by the reduced diameter, the tube including an inwardly extending detent restricting the ball from movement within the tube, the ball being engaged with the seat to close the orifice when the valve member is at a seated position, wherein the valve member includes a pintle head fixed to the tube and the tube includes a reduced diameter portion extending through the pintle head.

11. The injector of claim 10, wherein the tube includes another inwardly extending detent circumferentially spaced apart from the detent.

12. The injector of claim 10, wherein the detent is monolithically formed from the tube.

13. The injector of claim 10, wherein the detent includes an inner surface of the tube being in direct contact with the ball.

14. The injector of claim 10, wherein the tube provides a return path for reagent that has not been injected.

15. The injector of claim 10, wherein the tube includes apertures extending therethrough to provide a flow path for reagent.

16. An injector for injecting a reagent, comprising:
a housing including an orifice and a valve seat; and
an axially translatable valve member positioned within the housing, the valve member including a hollow tube having a substantially constant wall thickness and a ball, the tube including a distal end having a reduced diameter, the ball positioned within the tube partially extending beyond the distal end and being restricted from passing through the tube by the reduced diameter, the tube including an inwardly extending detent restricting the ball from movement within the tube, the ball being engaged with the seat to close the orifice when the valve member is at a seated position, wherein the distal end of the tube includes a partially spherically-shaped concave inner surface, and wherein an inner surface of the tube at the detent engages the ball to trap the ball between the partially spherically-shaped inner surface and the detent.

17. The injector of claim 10, wherein the tube includes a flange engaging the pintle head to retain the pintle head on the tube.

18. The injector of claim 17, wherein the tube includes a stop restricting movement of the pintle head toward the ball.

19. The injector of claim 18, wherein the stop includes a shoulder positioned at a transition between portions of the tube having different outer diameters.

\* \* \* \* \*